United States Patent [19]
Baumann et al.

[11] 3,761,748
[45] Sept. 25, 1973

[54] DYNAMOELECTRIC MACHINE HAVING END SHIELDS FOR IMPROVED VENTILATION

[75] Inventors: Frederick W. Baumann, Scotia; Albert R. Miller, Albany, both of N.Y.

[73] Assignee: General Electric Company, Schenectady, N.Y.

[22] Filed: July 10, 1972

[21] Appl. No.: 270,109

[52] U.S. Cl. ................................ 310/58, 310/62
[51] Int. Cl. .................................... H02k 9/00
[58] Field of Search ............... 310/58, 52, 53, 55, 310/57, 59, 62, 63

[56] References Cited
UNITED STATES PATENTS
| | | | |
|---|---|---|---|
| 3,383,530 | 5/1968 | Dunn | 310/52 |
| 3,610,975 | 10/1971 | Onjanow | 310/63 |
| 2,114,907 | 4/1938 | Oesterlin | 310/63 |
| 3,383,529 | 5/1968 | Baumann | 310/52 |
| 2,545,855 | 3/1951 | Luenberger | 310/58 |

Primary Examiner—R. Skudy
Attorney—Vale P. Myles

[57] ABSTRACT

A dynamoelectric machine is described wherein the end shields are mounted to the frame by means of a plurality of paced apart rabbet fits. Cooling air enters the machine through inlet openings in the end shield and, after cooling of the end turns of the machine winding, the air is exhausted through the zone between the end shield and the machine frame. The end shield also includes an external deflection flange which directs the exhaust air between fins along the exterior surface of the frame to cool the machine. Preferably, the deflection flange is thickened adjacent the rabbet fits to permit the end shields to be held securely during machining of the pads for the rabbet fits.

5 Claims, 5 Drawing Figures

PATENTED SEP 25 1973 3,761,748

DYNAMOELECTRIC MACHINE HAVING END SHIELDS FOR IMPROVED VENTILATION

FIELD OF THE INVENTION

The invention relates generally to dynamoelectric machines and, in particular, to dynamoelectric machines having easily fabricated end shields for producing improved ventilation of the machine.

DESCRIPTION OF THE PRIOR ART

One of the more significant problems in machine design is heat dissipation, i.e., Joulean heating of machine windings combined with heat generated by hysteresis and eddy currents within magnetic members of the machine tend to cause operating temperatures to rise as increased power is drawn from, or applied to, the machine. Dissipation of the heat generated in this manner therefore is required in order to prevent damage to the electrical insulation at the optimum rating of the machine.

One of the most efficient cooling systems for dynamoelectric machines from the standpoint of simplicity of construction and rate of heat dissipation is the "open" or dripproof system wherein atmospheric air admitted to the machine interior (typically through apertures in the end shield) is circulated in direct contact with the machine windings before being exhausted from the machine.

The exhaust openings for such machines normally heretofore have been holes provided in the stator frame, or the radially outer surface of the end shield, and an air deflecting member has shrouded at least the upper holes both to provide the dripproof characteristics for the machine and to cool the machine by heat transfer from the stator frame to the exhaust air stream. Because the size and number of the exhaust holes in the machine are limited by the mechanical design and strength required for the machine housing, the volume of air passed through the machine has been somewhat restricted by the exhaust openings. Moreover, the end shields and mating frame ends of prior art machines normally have required machining along substantially 360° of the peripheries forming their mating surfaces. Thus, these prior art constructions involved substantial expense for careful machining of the peripheral mating surfaces and also added expense for providing the separate exhaust openings in the machine. By the present invention, these deficiencies of the prior art have been overcome and a simplified arrangement for mounting the end shield is provided by which the amount of machining and resultant expense is reduced.

It is therefore an object of this invention to provide a dynamoelectric machine wherein end shields are provided which increase the volume of cooling air capable of passing through the machine.

Another object of this invention is to provide a dynamoelectric machine having an end shield requiring substantially less machining of the mating surfaces.

It is also an object of this invention to provide a dynamoelectric machine having an end shield having a radially outer air deflector with suitable reinforcement for retaining the air deflector in position during machining.

SUMMARY OF THE INVENTION

These and other objects of this invention generally are achieved by a machine characterized by a stator including an open-ended frame, a rotor mounted within the stator for rotation relative thereto and end shields attached to each end of the frame. At least one of the end shields includes a central hub, and a plurality of peripherally disposed spaced support members on the hub for engaging the frame to position the hub in a spaced relation with respect to the end of the frame. The end shield also contains apertures for admitting air into the machine while the exhaust openings are located between the frame and end shield intermediate adjacent support members. The end shield also is characterized by a deflection flange which overlies the exhaust openings in a spaced relation thereto to direct air exiting from the openings along the exterior of the frame.

DESCRIPTION OF THE PREFERRED EMBODIMENT

Figure 1:
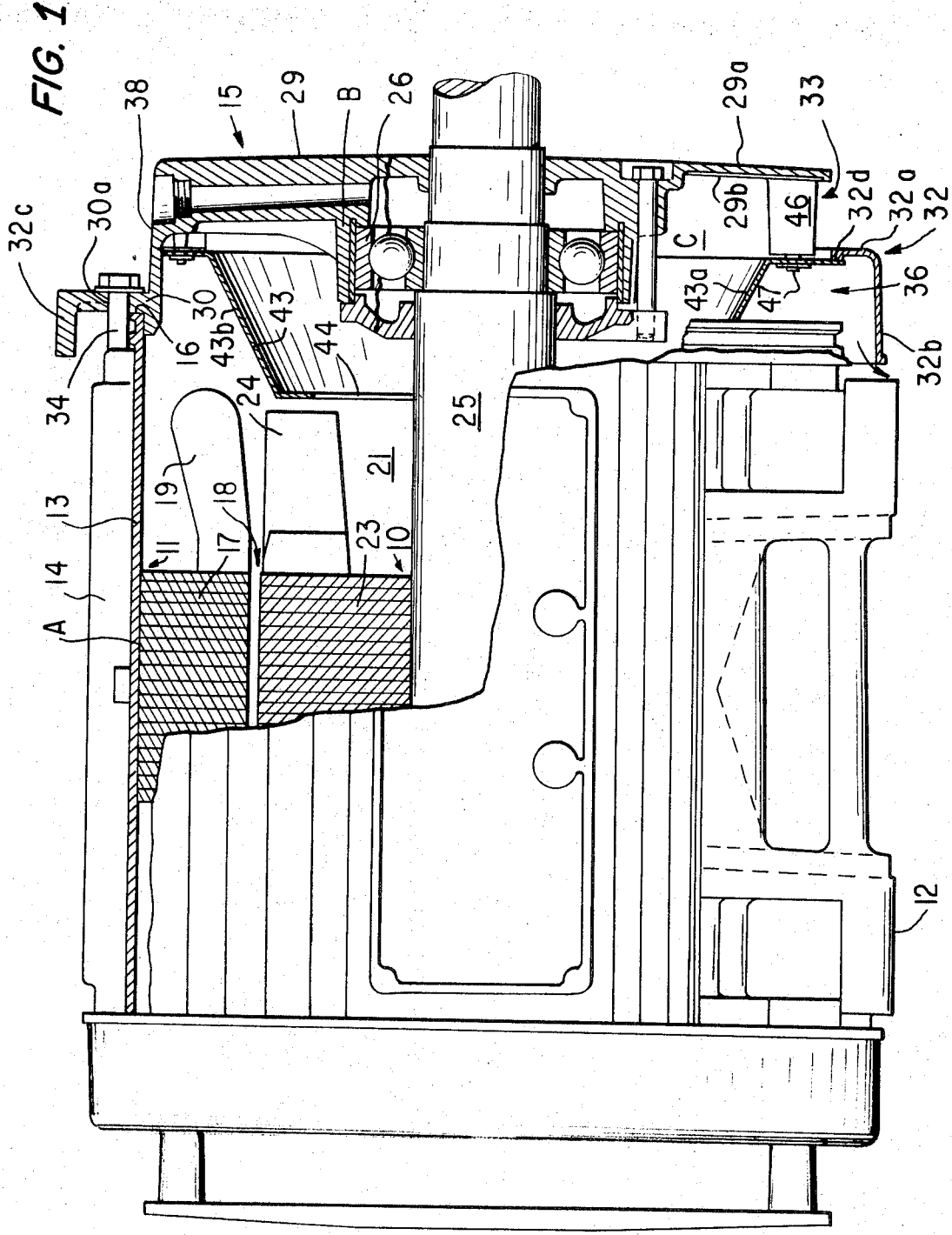
FIG. 1 is an elevation view, partly in section taken along line 1—1 of FIG. 5, of a dynamoelectric machine incorporating a preferred embodiment of this invention.
Figures 2, 5:
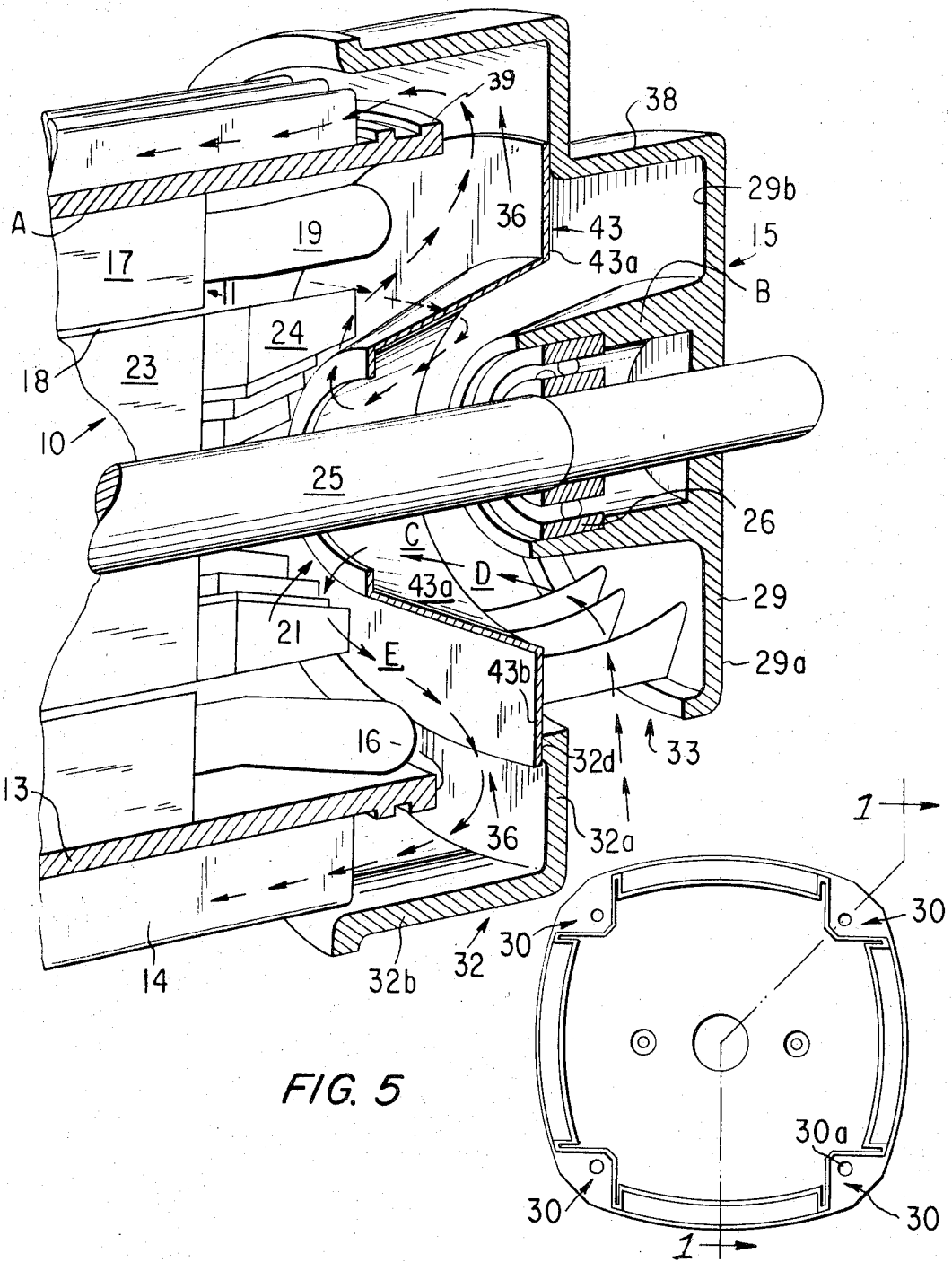
FIG. 2 is a perspective view of a cutaway section of the machine in FIG. 1, illustrating the flow path of the cooling air.
FIG. 5 is an end view of the machine of FIG. 1.

A typical induction motor, in accordance with this invention, is illustrated in FIGS. 1 and 2 and generally includes a shaft mounted rotor 10 which revolves in electromagnetic response to electrical energization of stator 11 to provide mechanical torque on the rotor shaft. In conventional fashion, stator 11 also includes a frame 13 open at its opposite ends so as to permit access to the interior thereof while a base 12 is secured to the lower exterior of the frame for mounting the motor. A plurality of cooling fins 14 extend axially along the exterior surface of the frame 13 to provide an increased heat transfer surface for dissipation of heat to the environment. End shields 15, at each end 16 of the frame 13, define air inlet and outlet paths to and from the motor interior. The stator elements within the frame 13 include an annular stack 17 of laminations of ferromagnetic material which is directly supported by the frame 13 as at surface A. Preferably, no air gap is provided between the frame 13 and the stack 17 to permit heat generated in stack 17 to be conducted directly to the frame 13 and fins 14 for dissipation into the atmosphere. Electrical windings contained within stack 17 have end turns 19 projecting axially from both sides of the stack 17 into respective end turn cavities 21, i.e., regions within the motor defined by stack 17, frame 13 and end shields 15. End turn cavities 21 thus provide an air space into which heat may be dissipated by convection from the end turns for subsequent removal from the motor interior.

Rotor 10 is conventional in design and includes a laminated rotor stack 23 of ferromagnetic material secured to a shaft 25 which is rotatably journaled in the respective end shields 15 by suitable bearings 26 positioned in the end shields. The rotor stack 23 is spaced radially inwardly from the stator stack 17 by a relatively close running tolerance, shown as air gap 18. Rotor 10 also includes a plurality of impellers, or fan blades, 24 which extend from either side of the rotor stack and project into the respective end turn cavities 21. These impellers 24 serve the dual function of conducting heat from the rotor assembly to the end turn cavities for dissipation therewithin and also for causing the circulation of cooling air through the cavities 21 as the rotor revolves.

Figure 4:
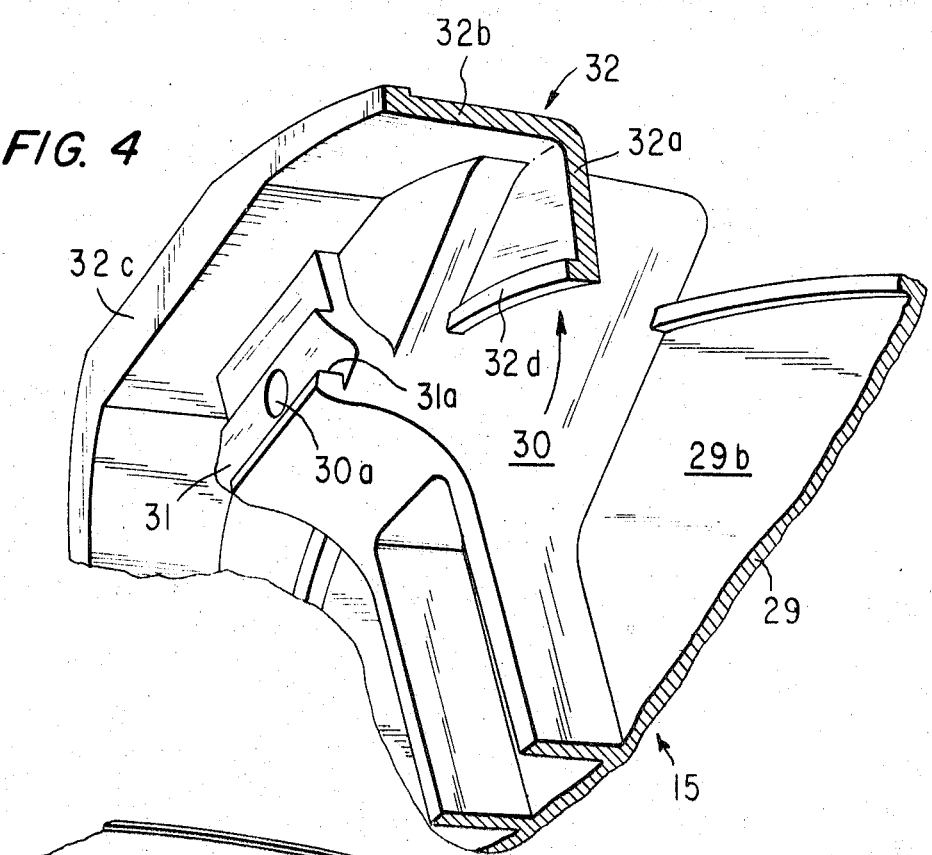
FIG. 4 is a perspective view of a fragmentary section of the end shield in FIG. 3 showing the interior surface thereof proximate one of the support members.
Figure 3:
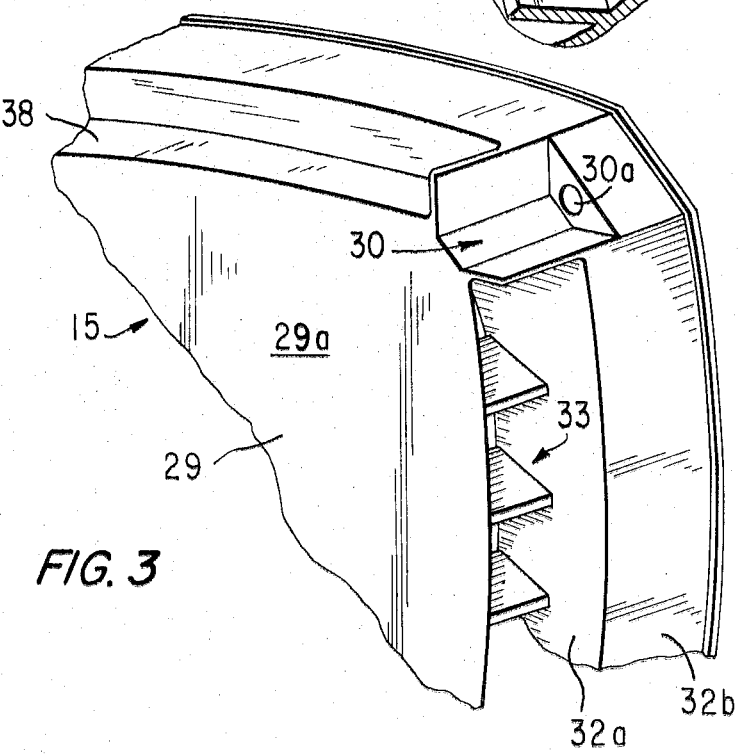
FIG. 3 is a perspective view of a fragmentary section of the end shield which is employed in FIG. 1 showing the exterior surface thereof proximate one of the support members.

In order to provide improved cooling of the motor with fewer parts and at less cost, end shields 15 of this invention (as seen in FIGS. 3, 4 and 5) are provided for mounting to the ends 16 of frame 13. Each end shield 15 comprises a hub member 29 having a generally planar exterior surface 29a and an interior surface 29b including a bearing mount B for receiving bearings 26 (see FIGS. 1, 2). Four support members 30, (see FIG. 5), each having a bolt receiving hole 30a therein, are peripherally spaced along the edge of the hub 29, and extend axially inwardly from interior surface 29b. The axially inner surface 31 of each of the support members 30, as seen in FIG. 4, is machined to form a rabbet 31a thereon adapted to mate with co-operating rabbets formed on frame end 16 to form discrete rabbet joints when end shields 15 are mounted to frame 13. Thus, rather than extending for a complete 360°, the rabbet fit between the end shield and the frame is accomplished by a plurality of, i.e., at least three and preferably four (as illustrated), rabbet fits. In order to maximize the exhaust apertures between the rabbet fits, each surface 31 preferably should extend over an arc no greater than 15° and the total rabbet fit between the end shield and the frame desirably should not exceed 90°. Consequently, the amount of machining required to fit the end shields to the frame is substantially reduced over prior art requirements. Mounting of end shields 15 to the frame may be augmented by bolts 34 extending through corresponding bolt holes 30a in the end shields (see FIG. 1) whereby the opposed end shields 15 are drawn together against the ends of the frame 13. Openings 33 defined along the bottom and sides of the end shields, i.e., between hub 29 and leg 32a of deflection flange 32, provide access from the exterior of the motor to air space C which is in direct communication with end turn cavity 21. The air then is exhausted through outlet openings 36 defined between the rabbet fits by end 16 of the motor frame and L-shaped deflection flange 32. The deflection flange 32 includes a first radially extending leg 32a and an annular second leg 32b which protrudes perpendicularly from leg 32a in an overlapping relationship with frame end 16. Portions 32c of annular leg 32b proximate supports 30 are thicker than adjacent portions of the leg to provide points at which end shields 15 may be securely held during the machining of surfaces 31 which mate with the frame in a rabbet fit. It also should be appreciated that the orientation of leg 32b is not limited to the perpendicular relationship with respect to leg 32a as described above. However, leg 32b should shroud outlet openings 36, in a spaced relation therewith and at a sufficient angular orientation so that a major portion of the air exiting from the outlet opening 36 is deflected axially along the exterior surface of the frame 13 between cooling fins 14. A drip flange 38, disposed along the top of end shield 15, serves to prevent foreign matter from entering the motor interior from above. Dual annular ledges 39 also are provided at each end of the motor frame to impart the dripproof characteristic to the frame (in conjunction with leg 32b) while permitting the frame to be shortened (for short stator stack motors) by removing the portion of the frame extending axially outward beyond the inner ledges on the frame.

It will be apparent from the foregoing description that an increased cooling capability is available with the end shield structure of this invention because the exhaust openings are limited in size only by the arcuate length of surfaces 31. This is an improvement over prior art end shields whose openings were limited by the overall size of the flange portion of the end shield within which holes were drilled.

An air deflector 43 (see FIGS. 1 and 2) having a centrally located aperture 44 is provided to at least partially define an incoming air flow path D and an outgoing air flow path E in the air space C between the end turn cavity 21 and the respective inlet and outlet openings 33 and 36. The air deflector 43, disposed in the air space C, is supported in a spaced relation with respect to the hub 29 by bolts 47 threaded into mounting members 46 extending from the interior surface 29b thereof. The air deflector is held at its outer periphery in engagement with a lip portion 32d (see FIG. 3) on leg 32a of the deflection flange between the inlet and outlet openings 33 and 36, respectively, and extends conically inwardly from the outer periphery into end turn cavity 21. Consequently, the incoming air flow path D is defined from the air inlet opening 33 passing between a first surface 43a of the air deflector 43 and the hub 29 through the deflector aperture 44 into the end turn cavity 21. The outgoing air flow path E is defined between the end turn cavity 21 and a second surface 43b of the air deflector 43 to the air outlet opening 36. Path E is further defined beyond the outlet openings 36 by air deflection flange 32 which guides the outgoing air axially between the cooling fins 14 on the exterior surface of the frame 13. It will be appreciated, however, that the invention is not limited to an air deflector of the particular shape illustrated. Rather, any air deflector will suffice which will, in conjunction with the disclosed end shield, serve to define separate air flow paths between the air inlets 33 and air outlets 36 within end turn cavity 21.

In the operation of a motor in accordance with this invention, energization of the stator 11 causes the rotor 10 to rotate so that the rotor impellers 24 effect a circulation of cooling air through end turn cavity 21. Cooling air enters the machine through the air inlet openings 33 and passes along the air flow path D between the air deflector 43 and hub 29 through the centrally disposed opening 44 in the air deflector into the end turn cavity 21. Air entering the cavity then passes into contact with the heated parts of the rotor 10 including the impellers 24 which circulate the air therethrough and also act as heat fins to dissipate heat from the rotor 10. The cooling air passing out of the end turn cavity 21 also contacts heated parts of the stator 11, including the stator winding end turns 19. The heated air then passes along the interior surface 43b of the air deflector and exits through the air outlet openings 36. The exiting air is deflected by the air deflection flange 32 along the exterior surface of the frame 13 so as to pass in heat exchange relation with the stator frame fins 14 which have received heat conducted thereto from the motor interior and particularly from stator laminations 17 in contact with the interior surface of the stator frame.

The cooling arrangement of this invention is advantageous because a single end shield member requiring less machining than prior end shields, and capable of providing larger cooling capability because it can have larger openings than such prior art end shields, can be used to direct cooling air through the motor interior to cool the stator and rotor in the end turn cavity and then direct that cooling air along the exterior surface of the motor frame to cool heat fins disposed therealong.

While we have shown and described various embodiments of the invention, it will be obvious to those skilled in the art that changes and modifications may be made without departing from the invention. It is therefore intended in the appended claims to cover all such changes and modifications that fall within the true spirit and scope of our invention.

What we claim as new and desire to be secured by Letters Patent of the United States is:

1. A dynamoelectric machine comprising a stator including a frame, a rotor mounted within the stator for rotation relative thereto, and end shields mounted at each end of the frame, at least one said end shield being characterized by:
   a. a hub;
   b. a plurality of peripherally spaced support members on said hub for mounting said hub in a spaced relation with respect to the frame end, each said support member having an inner surface thereon mated with said frame to form a discrete joint therewith, and each said inner surface being formed to extend over an arc no greater than 15° at said joint,
   c. air inlet openings within said end shield to provide for entry of air to the end turn cavity of the dynamoelectric machine,
   d. air exhaust openings between said end shield and said stator frame intermediate said support members, and
   e. a deflection flange overlapping the end of the frame in spaced relationship thereto to direct air exiting from said outlet openings along the exterior of the frame.

2. The combination of claim 1, wherein the total arcuate extent of the sum of said joint does not exceed 90°, and further including an air deflector mounted on each of said end shields between said air inlet openings and said air outlet openings; said air deflector defining a first air flow path from said air inlet openings into the interior of the machine and a second air flow path out from the interior of the machine through said air outlet openings.

3. A dynamoelectric machine comprising a stator including a frame, a rotor mounted within the stator for rotation relative thereto, and end shields mounted at each end of the frame, at least one said end shield being characterized by:
   a. a hub,
   b. a plurality of peripherally spaced support members on said hub for mounting said hub in a spaced relation with respect to the frame end, each of said support members having a rabbet thereon and the frame end having mating rabbets thereon such that a plurality of discrete rabbet joints are formed upon mounting each said end shield at its respective frame end,
   c. air inlet openings within said end shield to provide for entry of air to the end turn cavity of the dynamoelectric machine,
   d. air exhaust openings between said end shield and said stator frame intermediate said support members, and
   e. a deflection flange overlapping the end of the frame in spaced relationship thereto to direct air exiting from said outlet openings along the exterior of the frame.

4. A dynamoelectric machine comprising a stator including a frame, a rotor mounted within the stator for rotation relative thereto, and end shields mounted at each end of the frame, at least one said end shield being characterized by:
   a. a hub,
   b. a plurality of peripherally spaced support members on said hub for mounting said hub in a spaced relation with respect to the frame end,
   c. air inlet openings within said end shield to provide for entry of air to the end turn cavity of the dynamoelectric machine,
   d. air exhaust openings between said end shield and said stator frame intermediate said support members, and
   e. a deflection flange overlapping the end of the frame in spaced relationship thereto to direct air exiting from said outlet openings along the exterior of the frame, said deflection flange being of L-shaped cross section; a first leg of said L-shaped cross section extending radially in spaced relation to the frame end and a second leg extending perpendicularly from said first leg in overlapping spaced relation with respect to said frame, said second leg having an enhanced thickness adjacent said support members.

5. In a dynamoelectric machine comprising a stator including a frame, and a rotor mounted within the stator for rotation relative thereto, an end shield mounted at each end of the frame, at least one end shield comprising:
   a. a hub,
   b. a plurality of peripherally spaced support members on said hub for mounting said hub in a spaced relation with respect to the frame end, each of said support members having a rabbet thereon and the frame end having mating rabbets thereon such that a plurality of discrete rabbet joints are formed upon mounting each said end shield at its respective frame end,
   c. air inlet openings within said end shield to permit entry of air to said machine,
   d. air outlet openings between adjacent support members to provide for exit of air from the interior of the dynamoelectric machine,
   e. an air deflector mounted on each of said end shields between said air inlet openings and said air outlet openings, said air deflector defining a first air flow path from said air inlet openings into the interior of the machine and a second air flow path out from from the interior of the machine through said air outlet openings, and
   f. a deflection flange extending between said air inlet and air outlet openings and also overlapping the end of the frame in spaced relationship thereto to direct the air exiting from the dynamoelectric machine axially along the exterior of the frame.

* * * * *